June 19, 1962 H. SUTER 3,039,355
APPARATUS FOR INDICATING VARIATIONS IN THE
ATMOSPHERIC INDEX OF REFRACTION
Filed July 28, 1959
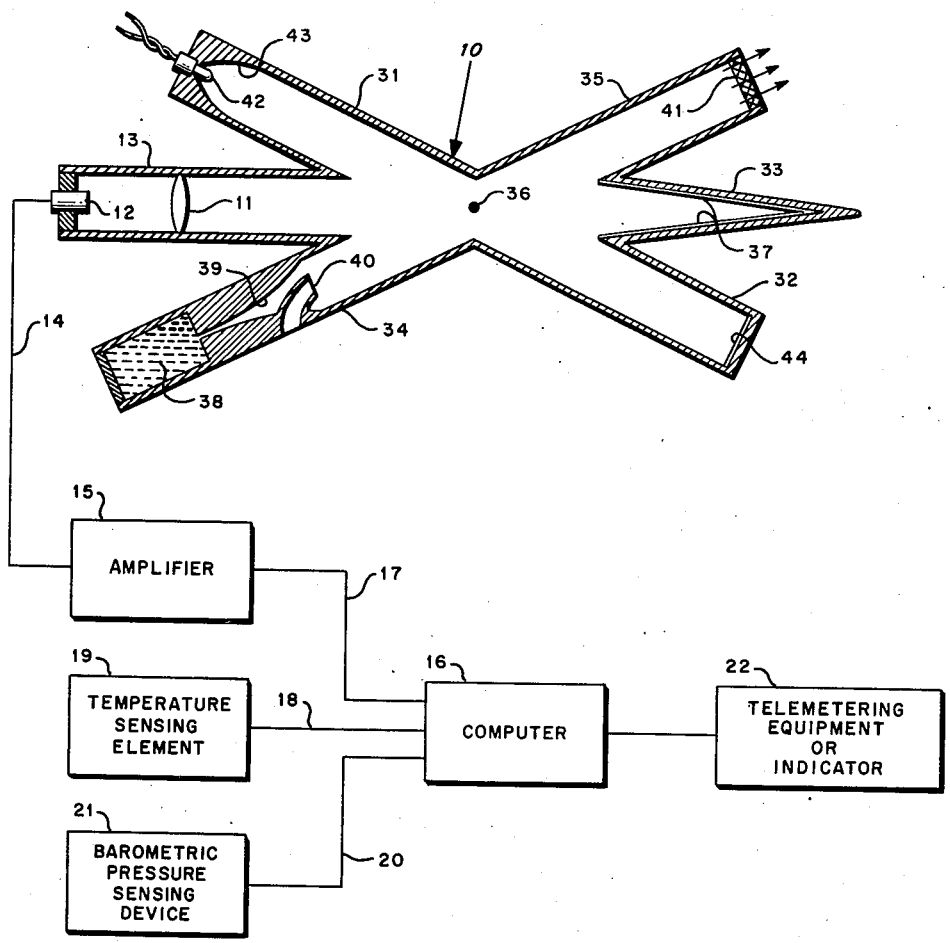
INVENTOR.
HENRY SUTER
BY
AGENT

# United States Patent Office 3,039,355
Patented June 19, 1962

3,039,355
APPARATUS FOR INDICATING VARIATIONS IN THE ATMOSPHERIC INDEX OF REFRACTION
Henry Suter, Hatboro, Pa., assignor to the United States of America as represented by the Secretary of the Navy
Filed July 28, 1959, Ser. No. 830,167
3 Claims. (Cl. 88—14)
(Granted under Title 35, U.S. Code (1952), sec. 266)

The invention described herein may be manufactured and used by or for the Government of the United States of America for governmental purposes without the payment of any royalties thereon or therefor.

This invention relates to an apparatus for indicating the index of refraction of various strata of the atmosphere, and more particularly to an improved apparatus for measuring any variation of the atmospheric index of refraction.

Difficulties have been encountered in the propagation of radio and radar waves. These difficulties arise out of variations in the atmospheric index of refraction and a solution of these difficulties requires that the index of refraction be known with relation to altitude and geographic location. For example, it has been found that where radio or radar waves have been propagated into a cloud bank or a stratum having a high moisture content that there is a shadow zone developed, referred to as a "radio hole," where radar waves, which naturally have a tendency to bend toward the surface of the earth, have a tendency to break or be deflected from the direction in which they have been propagated and be deflected into the high moisture or density area. As a result of this phenomena, which may be termed a scattering or splitting process, there is a shadow area or zone which is not properly penetrated and scanned by the radar waves. One of the particular difficulties arising from this phenomena, in areas where significant variations of the index of atmospheric refraction have not be detected, is that it is possible for an unidentified flying object to range within the activity area of certain radar units without the presence of the object becoming known. This is because the operators are not aware of certain formations involving a high concentration of moisture in the atmosphere, such as cloud banks, which may cause a significant variation in the atmospheric index of refraction.

Accordingly, it is desirable for the purpose of anticipating and countering radar detection difficulties, that variations of the atmospheric index refraction with relation to altitude and geographic location be known.

It is known that presently available radio-sonde apparatuses used to obtain weather data have been found to be unsatisfactory for atmospheric refraction index measurements because the data obtained is not continuous but provides only coarse grained sequential data on temperature, barometric pressure, and vapor pressure.

There is also available apparatus for obtaining reasonably acceptable data comprising a micro-wave refractometer type of equipment. However, this equipment is relatively expensive and is designed to be carried in a plane which must be flown through the air to be sampled. The plane must spiral down from possibly 20,000 feet to sea level at a rate of about 500 feet per minute during which measurements are made. The plane then must fly to 20,000 feet in an adjoining area at a distance of approximately 100 miles from the first area and then the downward spiral procedure is repeated. Obviously, this procedure is expensive and time consuming.

This invention contemplates the elimination of the necessity for employing an aircraft in the manner described and for increasing the reliability of the data obtained by monitoring the atmospheric index of refraction from various altitudes at various geographic locations.

One of the principal objects of this invention, therefore, is to provide an improved apparatus for continuously measuring the atmospheric index of refraction.

It is still another object of the invention to provide improved apparatus for continuously measuring and automatically recording atmospheric index of refraction from samples taken at various altitudes.

Another object of this invention is the provision of a novel means for obtaining data concerning the variations in the atmospheric index of refraction where the altitude and geographic location are known with a simple, rather compact, apparatus which is suitable for being embodied in a drop-sonde, or other device and which provides signals that can be monitored and/or telemetered.

A still further object of this invention is the provision of an improved apparatus for indicating and measuring variations of the atmospheric index of refraction by freezing the moisture in atmospheric samples continuously taken at various stratum or layers of the atmosphere and rapidly electrically sensing the number of moisture droplets in the samples by the brightness level of the reflected light as detected by a photoelectric cell, which brightness level is calibrated to be proportional to the instantaneous atmospheric vapor pressure.

A further object of the invention is to provide an improved apparatus of the character referred to which can be easily incorporated into an electrical system for directly and rapidly computing and telemetering the atmospheric index of refraction by substantially instantaneously sensing vapor pressure, the atmospheric temperature and pressure and computing the atmospheric index of refraction.

The invention further resides in certain novel features of construction, combinations and arrangements of parts, and further objects and advantages of the invention will be apparent to those skilled in the art to which it pertains from the following description and the present preferred embodiment thereof described in reference to the accompanying drawing, which forms a part of this specification, and wherein the same reference characters represent corresponding parts throughout the several views, and in which:

The drawing shows a schematic electromechanical diagram of an apparatus embodying the invention, and more particularly shows an atmospheric sampling apparatus substantially in cross-section.

It is to be understood that the invention is not limited to the details of construction and arrangement of parts shown in the drawing and hereinafter described in detail, but is capable of being otherwise embodied and of being practiced or carried out in various ways. It is to be further understood that the phraseology and terminology employed herein is for the purpose of description and there is no intention to herein limit the invention beyond the requirements of the prior art.

This invention provides a novel means of obtaining data concerning the variations in the atmospheric index of refraction where the altitude and geographic locations are known with a simple, rather compact, apparatus which is conducive to the embodiment of this system in a drop-sonde, or other device which provides signals that can be monitored by telemetering after being dropped from a plane flying at the maximum altitude at which the data is to be obtained. Temperatures and barometric pressures are easily measured by existing apparatus.

The moisture content of the air can be made readily measurable by a light scattering method by first cooling the sampled air to a very low temperature. Reference to psychrometric tables will indicate that at a stable condition the amount of saturated aqueous vapor that can exist in any given space depends entirely upon the temperature. If an unsaturated sample of air is progressively reduced in temperature, the percent humidity increases until saturation is reached, after which precipitation in the form of minute droplets is formed. The amount of precipitation would depend upon the final temperature and the original quantity of moisture in the sample. If the final temperature is made sufficiently low, the atmospheric pressure will become insignificant, and for practical purposes, all the moisture in the original air sample will be precipitated in the form of droplets.

The measurement of the moisture can be made continuous by a light scattering method, whereby a photoelectric cell continuously registers the light scattered by the precipitated droplets from a constant light source. Since the moisture need not be deposited for measurement, the system can be continuous, but not cumulative.

A vapor may be supersaturated, although this is an unstable condition. The excess moisture forms minute droplets about particles or ions which are present. It is understood that in some applications it may be advisable to hasten the formation of these droplets by artificial means as suggested in U.S. Patent 2,721,495, issued October 25, 1955, to J. J. Shaefer for a Method and Apparatus for Detecting Minute Crystal Forming Particles Suspended in a Gaseous Medium.

Referring to FIG. 1, a preferred form of the invention is shown solely for purposes of illustrating and describing a preferred embodiment of the invention. More particularly, the drawing shows a sample collecting and moisture content detecting apparatus, indicated generally by reference numeral 10. Since light scattering is utilized for particle detection, a detector unit comprising a focusing lens 11 and a photoelectric tube 12 are provided in a tubular section 13 of the unit 10. Electrical energy, characteristic of the reflected light level detected, is transmitted by the photo tube 12 via a conduit 14 to an amplifier unit 15. The light level detected by the photoelectric cell is proportional to the vapor pressure of the atmosphere. The output of the amplifier unit 15 is supplied to a computer 16 via a line 17. The temperature is fed into the computer 16 via a line 18 from a temperature sensing element unit 19. The barometric pressure data is supplied to the computer 16 by a conduit 20 from a barometric pressure sensing device 21. The computer 16 is coupled to a telemetering equipment or an indicator 22 of conventional design. It is to be understood that the computer 16 of the conventional digital or analog type can be provided and the modified index of refraction N, given by the following equation, can then be indicated or telemetered to a station in a known manner.

The computer 16 is for computing the following equation:

(1) $$N = (n-1)10^6$$

or (2) $$N = \frac{79P}{t} - \frac{11e}{t} + \frac{3.8 \times 10^5 e}{t^2}$$

where:
  $n$ is the index of refraction,
  N is the modified atmospheric index of refraction,
  P is the barometric pressure in millibars,
  $t$ is the temperature in degrees Kelvin, and
  $e$ is the water vapor pressure in millibars.

The rate of change of the modified index of refraction N with changes in altitude is of prime interest, since this change causes electromagnetic radiation to be diverted or deflected from a straight line propagation path. Generally, numerical values greater than negative 25N units per 1000 feet increase in altitude are considered to be cause for concern. The equipment illustrated measures the values of $t$, P, and $e$, operates on these values and combines them to produce and feed a modulation voltage, which is proportional to N, to the telemetering device 22. The barometric pressure is proportional to altitude, and this data may also be telemetered. Any of the many available temperature and pressure sensing devices may be employed depending upon the accuracy and economy required.

Particularly referring to the unit 10, a multiple barrel or tube device includes not only the barrel 13 but also the intercommunicating barrels 31, 32, 33, 34, and 35. The barrels 13 and 33 are coaxial and communicate with each other. The barrels 34 and 35 are coaxial and communicate with each other. Each axis of the barrels intersects at a common point 36.

A cooling unit 38 is located in the extreme outer end of the barrel 34 and preferably comprises liquid $CO_2$ or Freon adapted to be bled or metered through a diverging nozzle 39 and thereby cools the sample of air taken from a particular stratum. Samples are continuously taken from the atmosphere or any other aerosol by an elbow-shaped intake opening 40 in the side of the barrel 34. The inner end of the nozzle 39 is coaxial with the barrel 34. The nozzle 39 which conducts the coolant, permits the coolant to envelop the incoming sample of air by way of the intake duct 40 substantially in the high turbulence section of the nozzle 39. The coaxial barrel 35 has a fluid metering grid 41 on its outer extremity with numerous perforations therein for permitting the controlled exhaust of the air sample, which is being continuously inducted through the intake duct 40.

A light filament 42 is energized by a standard electrical power source, not shown, and is positioned in the outer end of the barrel 31 in an appropriate well-known relationship with a parabolic reflector 43 fixed within the outer end of the barrel 31. Light rays from the light filament 42 are reflected by the parabolic reflector 43 in parallel lines parallel to the axis of the barrel 31 and preferably against a reflecting surface such as a mirror 44 in the outer end of the coaxial barrel 32.

Accordingly, as the sample of air comes into intake 40, the moisture in the air is crystallized and as the crystals or droplets are carried toward the exhaust 41 it crosses the beam of light being transmitted through barrels 31 and 32 and causes a number of reflective light beams to be directed towards the focusing lens 11 and detected by the photo tube 12. The barrel 33 is conically-shaped and the inner surface thereof is provided light absorbing material 37 so as to be substantially nonreflective so that the actual number of light reflecting droplets detected by the focusing lens 11 will not again be detected so that any false detecting will take place. Restated, the light absorbing material in the barrel 33 forms a light trap and thereby eliminates false, spurious reflections which would be a prodigious source of phototube noise and result in an erroneous detection of the light energy scattered by the particles passing through the exhaust in the thin air stream as the particles intersect the high intensity light beam from the light source 42. From the foregoing, it is seen that a continuous sample of air is taken as the unit 10 is droped from a high altitude towards the ground.

When the equipment is dropped as a drop-sonde, the rate of fall thereof would probably be in the order of 40 to 80 feet per second. However, the rate of fall is, of course, dependent upon the terminal velocity of the unit as a whole. In order for the device to respond to stratified air layers of a few feet in thickness, the response time of all such developments must be short, that is, on the order of a second or preferably less. Conventional variable pressure and temperature elements are satisfactory but existing humidity sensing elements are usually very slow since they operate on the order of minutes.

One of the important features of the invention is that a rapid continuous measurement of moisture in an air sample with a simple light source, a small container of liquid carbon dioxide, and a photoelectric cell, is permitted. The air sample is injected into the center of the stream of expanded carbon dioxide gas and as the air cools, saturation is reached and passed. All of the moisture precipitates in the form of droplets, which pass through the light beam provided by the light filament 42 with its parabolic reflector 43 at one end and possibly a mirror 44 at the other end. The light filament 42 is placed at the focus of the parabolic reflector 43 in such a way that only light scattered by the droplets is effective in registering on the phototube 12.

Although the above description indicates that the air sample is cooled by expanding carbon dioxide, Freon, or the like, the cooling can be effected by many other means. Cooling the air to the point where the vapor pressure is trivial relative to that of the original sample and then measuring it for the light scattering properties of the cooled sample, provides a novel means of continuously measuring the moisture content of a given volume of aerosol, the quantity of aerosol passing through the device being known and metered out at a selected rate.

It is contemplated that the unit can be dropped from an aircraft, or alternatively, the unit can be fired vertically upwardly through the atmosphere with a rocket and then released at a predetermined altitude for telemetering the moisture content of the air back to a receiving station. Normally, the atmospheric index of refraction does not vary considerably above 10,000 feet and usually the samples may be taken from altitudes up to 10,000 feet.

It is the intention to hereby cover not only the above-mentioned modification but all adaptations, modifications and uses thereof which come within the practice of those skilled in the art to which the invention relates and the scope of the dependent claims.

What is claimed is:

1. Apparatus for measuring the vapor pressure of an aerosol comprising: first barrel means having an intake at one end for inducting and forming a continuous stream of aerosol therein, refrigerating means for crystallizing any moisture in the stream, and an exhaust at an opposite end; second barrel means intersecting and intercommunicating with the interior of said first barrel means having a light beam source at one end for projecting a beam of light at the stream carrying the crystallized moisture; third barrel means intersecting and intercommunicating with the interiors of said first and second barrel means having a photoelectric cell and focusing lens means therefor at one end for detecting the scattering of light caused by the crystallized moisture passing through said light beam; and means for telemetering the vapor pressure of the aerosol detected by said photoelectric cell.

2. Apparatus for measuring the vapor pressure of an aerosol comprising: first barrel means for inducting and forming a continuous stream of aerosol therein, a refrigerant, nozzle means communicating with said first barrel means for injecting said refrigerant into said stream for crystallizing any moisture in the stream, second barrel means intersecting and intercommunicating with the interior of said first barrel means having a light beam source at one end thereof for projecting a beam of light at said stream carrying the crystallized moisture, third barrel means intersecting and intercommunicating with the interiors of said first and second barrel means and having a photoelectric cell means at one end for detecting the scattering of light caused by the crystallized moisture passing through said light beam.

3. Apparatus for computing the modified index of refraction of atmospheric air comprising, first barrel means having an intake for inducting a continuous stream of air therein and having refrigerating means comprising expending liquid carbon dioxide through a nozzle into the air stream for crystallizing the moisture in the air, said first barrel means having an exhaust duct at an opposite end thereof and functioning to conduct said crystallized moisture from said intake duct to said exhaust duct of said first barrel means, second barrel means intersecting said first barrel means and having a light beam source at one end thereof for projecting a beam of light at said air stream carrying said crystallized moisture, third barrel means intersecting and intercommunicating with the interiors of said first and second barrel means and having a photoelectric cell and focusing lens means therefor at one end, and said photoelectric cell in said third barrel means for detecting the scattering of light caused by said crystallized moisture passing through said light beam, temperature and atmospheric pressure sensing means, and means coupled with said temperature and atmospheric pressure sensing means and said photoelectric cell for computing and telemetering the moisture content of the atmospheric air and thereby obtaining the modified atmospheric index of refraction.

References Cited in the file of this patent

UNITED STATES PATENTS

| | | |
|---|---|---|
| 2,429,474 | McMahon | Oct. 21, 1947 |
| 2,654,242 | Fallgatter et al. | Oct. 6, 1953 |
| 2,709,843 | Hartley | June 7, 1955 |
| 2,909,960 | Orr et al. | Oct. 27, 1959 |
| 2,938,423 | Rich | May 31, 1960 |
| 2,956,435 | Rich | Oct. 18, 1960 |